US010904154B2

(12) United States Patent
Tang

(10) Patent No.: US 10,904,154 B2
(45) Date of Patent: Jan. 26, 2021

(54) METHODS AND DEVICES FOR DATA PROCESSING

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/516,092

(22) Filed: Jul. 18, 2019

(65) Prior Publication Data

US 2019/0342224 A1 Nov. 7, 2019

Related U.S. Application Data

(63) Continuation of application No. 16/457,633, filed on Jun. 28, 2019, now abandoned, which is a (Continued)

(30) Foreign Application Priority Data

Jul. 31, 2017 (WO) ................ PCT/CN2017/095211

(51) Int. Cl.
*H04L 12/823* (2013.01)
*H04L 5/00* (2006.01)
(Continued)

(52) U.S. Cl.
CPC .......... *H04L 47/323* (2013.01); *H04L 5/0055* (2013.01); *H04L 49/90* (2013.01); *H04L 69/324* (2013.01); *H04W 84/042* (2013.01)

(58) Field of Classification Search
CPC ..... H04L 47/323; H04L 49/90; H04L 5/0055; H04L 69/324; H04L 2012/5648; H04W 84/042
(Continued)

(56) References Cited

U.S. PATENT DOCUMENTS

2010/0029280 A1 2/2010 Tenny
2010/0177733 A1 7/2010 Yi
(Continued)

FOREIGN PATENT DOCUMENTS

CN 1771685 A 5/2006
CN 102316516 A 1/2012
(Continued)

OTHER PUBLICATIONS

R2-1706376; 3GPP TSG-RAN WG2 Meeting #NR AH2; Qingdao, China, Jun. 27-29, 2017; Source:CATT;Title:Impact of PDCP duplication on RLC;See Section 2.1 & 2.1.1 (Year: 2017).*
(Continued)

*Primary Examiner* — Hassan A Phillips
*Assistant Examiner* — Mohammed S Chowdhury
(74) *Attorney, Agent, or Firm* — Ladas & Parry, LLP

(57) ABSTRACT

Data processing methods and related devices are provided. The data processing method includes that: a first device (600), responsive to detecting that a first Radio Link Control (RLC) Protocol Data Unit (PDU) associated with a first RLC Service Data Unit (SDU) and processed by a first RLC-layer entity is completely delivered, interrupts processing a second RLC SDU, a data duplication and transmission function of a Packet Data Convergence Protocol (PDCP)-layer entity being in an active state, the first RLC PDU being an RLC PDU in at least one RLC PDU corresponding to the first RLC SDU and the first RLC SDU being the same as the second RLC SDU.

13 Claims, 7 Drawing Sheets

Related U.S. Application Data continuation of application No. PCT/CN2018/082889, filed on Apr. 12, 2018.

(51) Int. Cl.
    *H04L 12/861*     (2013.01)
    *H04L 29/08*     (2006.01)
    *H04W 84/04*     (2009.01)

(58) Field of Classification Search
    USPC .......................................................... 370/328
    See application file for complete search history.

(56) References Cited

U.S. PATENT DOCUMENTS

| | | |
|---|---|---|
| 2011/0205906 A1 | 8/2011 | Yi |
| 2014/0003346 A1 | 1/2014 | Yi et al. |
| 2014/0362832 A1 | 12/2014 | Rudolf et al. |
| 2016/0212661 A1* | 7/2016 | Basu Mallick ....... H04L 1/1614 |
| 2016/0234714 A1 | 8/2016 | Basu Mallick et al. |
| 2017/0019807 A1 | 1/2017 | Yi et al. |
| 2017/0064534 A1 | 3/2017 | Loehr et al. |
| 2017/0238195 A1* | 8/2017 | Hao .................. H04W 56/0015 370/328 |
| 2017/0331595 A1 | 11/2017 | Rudolf et al. |
| 2018/0192308 A1 | 7/2018 | Yi et al. |
| 2018/0287748 A1* | 10/2018 | Kim ....................... H04L 47/30 |
| 2018/0368107 A1* | 12/2018 | Babaei .................. H04W 76/00 |
| 2019/0230736 A1* | 7/2019 | Quan .................... H04L 1/0084 |
| 2019/0268785 A1 | 8/2019 | Yi et al. |

FOREIGN PATENT DOCUMENTS

| | | |
|---|---|---|
| CN | 102395156 A | 3/2012 |
| CN | 103841439 A | 6/2014 |
| CN | 104486045 A | 4/2015 |
| CN | 106304154 A | 1/2017 |
| CN | 106464715 A | 2/2017 |
| WO | 2009035262 A1 | 3/2009 |
| WO | 2016061789 A1 | 4/2016 |
| WO | 2019023862 A1 | 2/2019 |
| WO | 2019024535 A1 | 2/2019 |

OTHER PUBLICATIONS

International Search Report in international application No. PCT/CN2018/082889, dated Jun. 27, 2018.
Written Opinion of the International Search Authority in international application No. PCT/CN2018/082889, dated Jun. 27, 2018.
International Search Report in international application No. PCT/CN2017/095211, dated Mar. 28, 2018.
Written Opinion of the International Search Authority in international application No. PCT/CN2017/095211, dated Mar. 28, 2018.
Taiwanese Search Report in the Taiwanese application No. 107126588, dated Aug. 26, 2019.
Ericsson. "Data duplication in lower layers (HARQ)", 3GPP TSG-RAN WG2 #97 Tdoc R2-1702032, published on Feb. 26, 2017.
CATT: "PDCP Duplication", 3GPP Draft; R2-1703114, 3rd Generation Partnership Project (3GPP), Mobile Competence Centre ; 650, Route Des Lucioles; F-06921 Sophia-Antipolis Cedex; France vol. RAN WG2, No. Spokane, USA; Apr. 3, 2017-Apr. 7, 2017 Apr. 3, 2017Apr. 3, 2017), XP051245053, Retrieved from the Internet: URL: http://www.3gpp.org/ftp/Meetings_3GPP_SYNC/RAN2/Docs/ [retrieved on Apr. 3, 2017]* paragraph [02.4] *.
Ericsson: "Duplication in UL in Dual connectivity", 3GPP Draft; R2-1702750—Duplication in UL in Dual Connectivity, 3rd Generation Partnership Project (3GPP), Mobile Competence Centre: 650, Route Des Lucioles; F-06921 Sophia-Antipolis Cedex: France vol. RAN WG2, No. Spokane, USA; Apr. 3, 2017-Apr. 7, 2017 Apr. 3, 2017 (Apr. 3, 2017), XP051244738, Retrieved from the Internet: URL: http://www.3gpp.org/ftp/Meetings_3GPP_SYNC/RAN2/Docs/ [retrieved on Apr. 3, 2017]* paragraph [02.2] *.
Interdigital: "RLC buffer management and polling", 3GPP Draft: R2-081833, 3rd Generation Partnership Project (3GPP), Mobile Competence Centre ; 650, Route Des Lucioles: F-06921 Sophia-Antipolis Cedex; France, vol. RAN WG2, No. Shenzhen, China; Mar. 25, 2008, Mar. 25, 2008 (Mar. 25, 2008), XP050139529, [retrieved on Mar. 25, 2008] * paragraph [0002] *.
Supplementary European Search Report in the European application No. 18840886.8, dated Jul. 1, 2020.
First Office Action of the Chilean application No. 201902490, dated Jul. 20, 2020.
First Office Action of the Canadian application No. 3050191, dated Aug. 13, 2020.
First Office Action of the Chinese application No. 201911320932.3, dated Nov. 3, 2020.

* cited by examiner

Terminal

METHODS AND DEVICES FOR DATA PROCESSING

CROSS-REFERENCE TO RELATED APPLICATIONS

This application is a continuation application of U.S. application Ser. No. 16/457,633 filed on Jun. 28, 2019, which is a continuation application of PCT Application No. PCT/CN2018/082889, filed on Apr. 12, 2018 and entitled "method and products for data processing", which claims priority to PCT Application No. PCT/CN2017/095211 filed on Jul. 31, 2017, the contents of which are hereby incorporated by reference in their entireties.

BACKGROUND

A 4th Generation (4G) mobile communication network, for example, a Long Term Evolution (LTE) network, has realized extensive coverage at present. A 4G network has such characteristics as high communication speed, wide network spectrum, flexible communication and the like. However, along with emergence of network requirements such as the Internet of things and the Internet of vehicles, users have made increasing requirements on next-generation mobile communication networks, i.e., 5th Generation (5G) mobile communication networks, for example, requiring a user experience rate of 100 megabytes per second (Mbps) of continuous wide area coverage, a user experience rate of 1 Gigabyte per second (Gbps) of a hot spot, an air interface delay of 1 millisecond (ms), an end-to-end delay within 100 ms and a reliability guarantee.

For further improving the spectrum efficiency of a communication system and a data throughput of a user, a Carrier Aggregation (CA) technology is introduced into an LTE-Advanced (LTE-A) system. CA refers to that User Equipment (UE) may use multiple Component Carriers (CCs) for uplink and downlink communication at the same time, thereby achieving high-speed data transmission.

At present, according to a data duplication solution supported by CA in a 5G (New Radio (NR)) system, a Packet Data Convergence Protocol (PDCP)-layer entity distributes two duplicated PDCP Protocol Data Units (PDUs) respectively to two Radio Link Control (RLC)-layer entities (with different logical channels respectively).

SUMMARY

The disclosure relates to the technical field of communications, and particularly to a method and product for data processing.

Embodiments of the disclosure provide methods and devices for data processing, so as to avoid data buffer overflow of a second RLC entity and improve security of data transmission.

According to a first aspect, an embodiment of the disclosure provides a method for data processing, which may be applied to a first device, the first device including a PDCP-layer entity and a first RLC-layer entity and the method including the following operations.

Responsive to detecting that a first RLC PDU associated with a first RLC Service Data Unit (SDU) and processed by the first RLC-layer entity is completely delivered, processing a second RLC SDU is interrupted, a data duplication and transmission function of the PDCP-layer entity being in an active state, the first RLC PDU being an RLC PDU in at least one RLC PDU corresponding to the first RLC SDU and the first RLC SDU being the same as the second RLC SDU.

According to a second aspect, an embodiment of the disclosure provides a data processing method, which may be applied to a second device and include the following operations.

An Acknowledgement (ACK) is sent to a first device, the ACK being configured for the first device to, responsive to detecting that a first RLC PDU associated with a first RLC SDU and processed by a first RLC-layer entity is completely delivered, interrupt processing a second RLC SDU, the first RLC SDU being the same as the second RLC SDU, the first RLC PDU being an RLC PDU in at least one RLC PDU corresponding to the first RLC SDU and a data duplication and transmission function of the PDCP-layer entity of the first device being in an active state.

According to a third aspect, an embodiment of the disclosure provides a first device, which has a function of implementing operations of a first device in the abovementioned method. The function may be realized through hardware or by executing software through the hardware. The hardware or software includes one or more modules corresponding to the function.

In a possible design, the first device includes a processor, and the processor is configured to support the first device to realize the corresponding function in the method. Furthermore, the first device may further include a communication interface, and the communication interface is configured to support communication between the first device and a second device. Furthermore, the first device may further include a memory, and the memory is configured to be coupled to the processor, and stores a necessary program instruction and data of the first device.

According to a fourth aspect, an embodiment of the disclosure provides a second device, which has a function of implementing operations of the second device in the above mentioned method. The function may be realized through hardware or by executing corresponding software through the hardware. The hardware or software includes one or more modules corresponding to the function.

In a possible design, the second device includes a processor, and the processor is configured to support the second device to realize the corresponding function in the method. Furthermore, the second device may further include a communication interface, and the communication interface is configured to support communication between the second device and a first device. Furthermore, the second device may further include a memory, and the memory is configured to be coupled to the processor, and stores a necessary program instruction and data of the second device.

According to a fifth aspect, an embodiment of the disclosure provides a first device, which may include a processor, a memory, a communication interface and one or more programs. Here, the one or more programs may be stored in the memory and configured to be executed by the processor, and the programs may include instructions configured to execute the steps in any method according to the first aspect of the embodiments of the disclosure.

According to a sixth aspect, an embodiment of the disclosure provides a second device, which may include a processor, a memory, a communication interface and one or more programs. Here, the one or more programs may be stored in the memory and configured to be executed by the processor, and the programs may include instructions configured to execute the steps in any method according to the second aspect of the embodiments of the disclosure.

According to a seventh aspect, an embodiment of the disclosure provide a computer-readable storage medium, which may store a computer program for electronic data exchange, the computer program enabling a computer to execute part or all of the steps described in any method according to the first aspect of the embodiments of the disclosure.

According to an eighth aspect, an embodiment of the disclosure provides a computer-readable storage medium, which may store a computer program for electronic data exchange, the computer program enabling a computer to execute part or all of the steps described in any method according to the second aspect of the embodiments of the disclosure.

According to a ninth aspect, an embodiment of the disclosure provides a computer program product, which includes a non-transitory computer-readable storage medium storing a computer program. The computer program may be operated to enable a computer to execute part or all of the steps described in any method according to the first aspect of the embodiments of the disclosure. The computer program product may be a software installation package.

According to a tenth aspect, an embodiment of the disclosure provides a computer program product, which includes a non-transitory computer-readable storage medium storing a computer program. The computer program may be operated to enable a computer to execute part or all of the steps described in any method according to the second aspect of the embodiments of the disclosure. The computer program product may be a software installation package.

From the above, according to the embodiments of the disclosure, the first device, responsive to detecting that the first RLC PDU which is associated with the first RLC SDU and processed by the first RLC-layer entity is completely delivered, interrupts processing the second RLC SDU, the data duplication and transmission function of the PDCP-layer entity being in an active state, the first RLC PDU being an RLC PDU in at least one RLC PDU corresponding to the first RLC SDU and the first RLC SDU being the same as the second RLC SDU. Thus it can be seen that, when a carrier channel condition corresponding to the first RLC-layer entity is superior to a carrier channel condition corresponding to the second RLC-layer entity, there may exist such a condition that the first RLC PDU processed by the first RLC-layer entity and corresponding to the first RLC SDU is completely processed but the second RLC SDU processed by the second RLC-layer entity and the same as the first RLC SDU is incompletely processed, and under this condition, processing the second RLC SDU is interrupted. Therefore, data buffer overflow of the second RLC-layer entity may be avoided, and improved security of data transmission can be achieved.

BRIEF DESCRIPTION OF DRAWINGS

The drawings to be used for descriptions about the embodiments or a conventional art will be simply introduced below.

DETAILED DESCRIPTION

The technical solutions in the embodiments of the disclosure will be described below in combination with the drawings.

Figure 1:
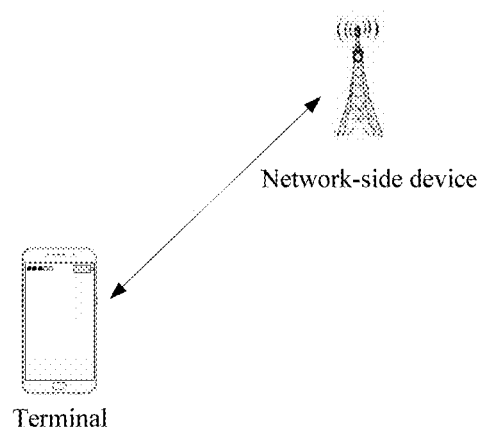
FIG. 1 is a possible network architecture diagram of a communication system according to an embodiment of the disclosure.

Referring to FIG. 1, FIG. 1 is a possible network architecture of an exemplary communication system according to an embodiment of the disclosure. The exemplary communication system may be, for example, a Global System for Mobile Communications (GSM), a Code Division Multiple Access (CDMA) system, a Time Division Multiple Access (TDMA) system, Wideband Code Division Multiple Access (WCDMA) system, a Frequency Division Multiple Addressing (FDMA) system, an Orthogonal Frequency-Division Multiple Access (OFDMA) system, a Single Carrier FDMA (SC-FDMA) system, a General Packet Radio Service (GPRS) system, an LTE system, a 5G/NR system or other similar communication systems. The exemplary communication system specifically includes a network-side device and a terminal. When the terminal accesses a mobile communication network provided by the network-side device, the terminal makes a communication connection with the network-side device through a wireless link. Such a communication connection manner may be a single-connection manner or a dual-connection manner or a multi-connection manner. When the communication connection manner is a single-connection manner, the network-side device may be an LTE base station or an NR base station (also called a gNB). When the communication manner is a dual-connection manner (which may specifically be implemented by a CA technology or implemented by multiple network-side devices) and when the terminal is connected with multiple network-side devices, the multiple network-side devices may be a Master Cell Group (MCG) and Secondary Cell Groups (SCGs), data is transmitted back between the cell groups through backhauls, the MCG may be an LTE base station and the SCGs may be LTE base stations, or, the MCG may be an NR base station and the SCGs may be LTE base stations, or, the MCG may be an NR base station and the SCGs may be NR base stations.

In the embodiments of the disclosure, terms "network" and "system" are often used alternately and their meanings may be understood by those skilled in the art. A terminal involved in the embodiments of the disclosure may include various handheld devices, vehicle-mounted devices, wearable devices, computing devices or other processing devices connected to wireless modems, which have a wireless communication function, as well as UE, Mobile Stations (MSs), terminal devices and the like in various forms. For convenient description, the devices mentioned above are collectively referred to as terminals.

In the embodiments of the disclosure, a first device and a second device are involved. When the first terminal is a terminal, the second device is a network-side device, or, when the first device is a network-side device, the second device is a terminal. The entities (for example, a PDCP-layer entity, an RLC-layer entity, a Media Access Control (MAC)-layer entity or the like) in the network-side device may exist in the same apparatus or in multiple different apparatuses.

Figure 2A:
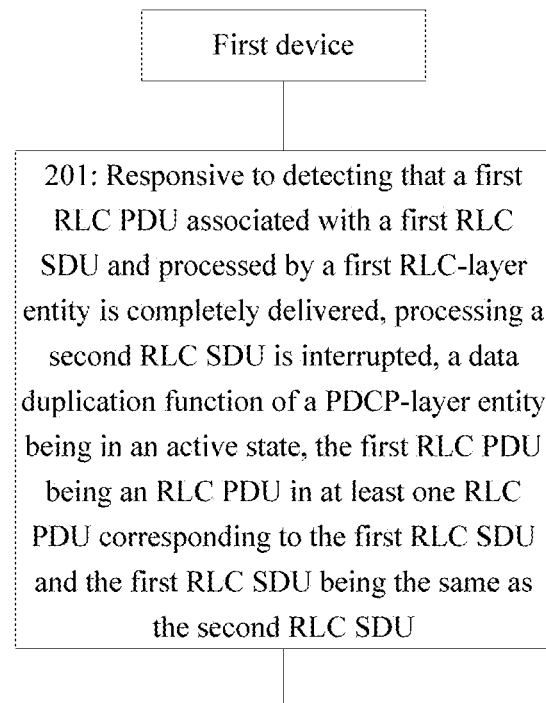
FIG. 2A is a flowchart of a data processing method according to an embodiment of the disclosure.

Referring to FIG. 2A, FIG. 2A is a data processing method according to an embodiment of the disclosure, which is applied to a first device. The first device includes a PDCP-layer entity and a first RLC-layer entity. The method includes the following operations.

In the operation 201, the first device, responsive to detecting that a first RLC PDU associated with a first RLC SDU and processed by the first RLC-layer entity is completely delivered, interrupts processing a second RLC SDU, a data duplication and transmission function of the PDCP-layer entity being in an active state, the first RLC PDU being an RLC PDU in at least one RLC PDU corresponding to the first RLC SDU and the first RLC SDU being the same as the second RLC SDU.

The data duplication and transmission function of the PDCP-layer entity may also be in an inactive state. There is no unique limit made herein.

Figure 2B:
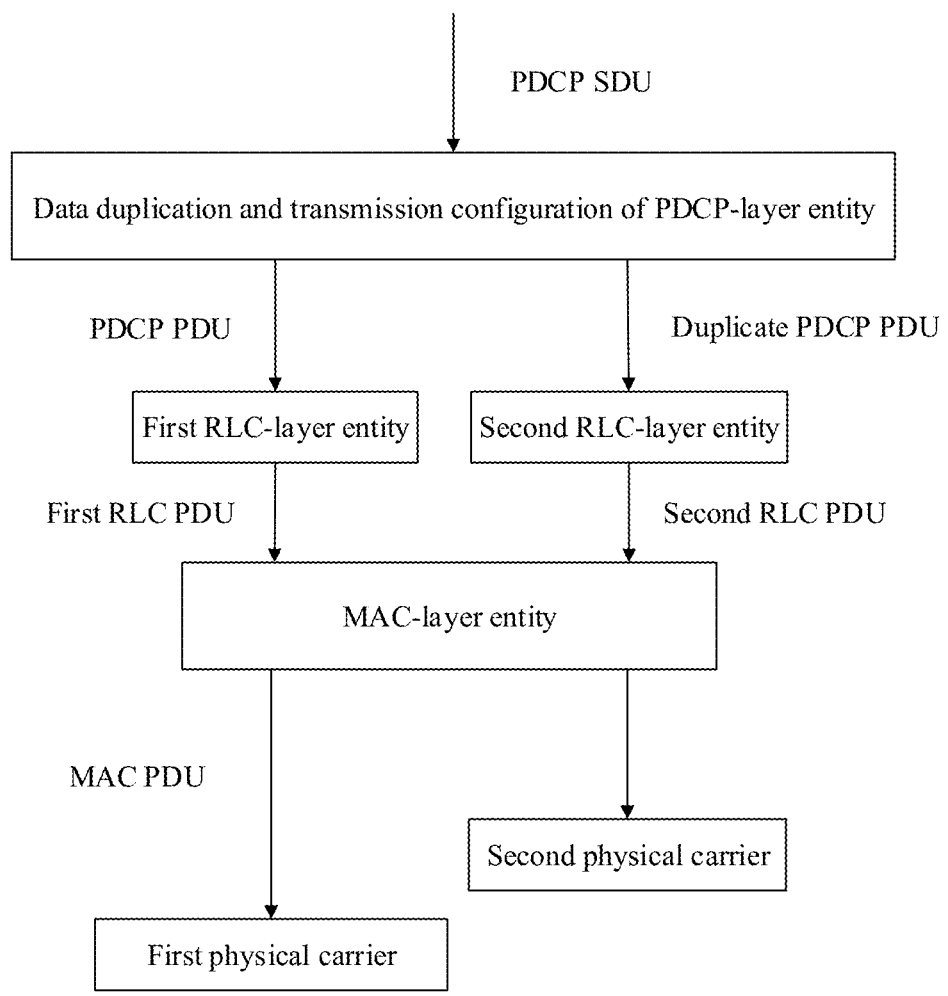
FIG. 2B is a flowchart of data transmission according to an embodiment of the disclosure.

The data duplication and transmission function of the PDCP-layer entity is shown in FIG. 2B. When the data duplication and transmission function of the PDCP-layer entity is in an off state, the PDCP-layer entity, when receiving a PDCP SDU, encapsulates and processes the PDCP SDU to obtain a PDCP PDU and transmits the PDCP PDU to the first RLC-layer entity, and then the first RLC-layer entity performs encapsulation and processing to obtain the first RLC PDU and transmits the obtained first RLC PDU to a MAC-layer entity. When the data duplication and transmission function of the PDCP-layer entity is in an active state, the PDCP-layer entity encapsulates and processes the PDCP SDU to obtain two PDCP PDUs which are the same, i.e., a PDCP PDU and a duplicate PDCP PDU, and the PDCP-layer entity transmits the PDCP PDU and the duplicate PDCP PDU to the first RLC-layer entity and a second RLC-layer entity respectively, and in such a case, the first RLC SDU of the first RLC-layer entity is the same as the second RLC SDU of the second RLC-layer entity.

Here, an SDU of an entity of each layer in a data transmission process is associated with a PDCU sent by an entity of its upper layer, and a PDU of an entity of each layer corresponds to an SDU of an entity of its lower layer.

Here, when the first RLC-layer entity encapsulates and processes the first RLC SDU to obtain an RLC PDU, the first RLC-layer entity may cut and encapsulate the first RLC SDU to obtain multiple RLC PDUs, and the first RLC PDU is an RLC PDU in the multiple RLC PDUs. In addition, under the condition that the first RLC-layer entity cuts and encapsulates the first RLC SDU to obtain multiple RLC PDUs, an implementation mode that the first device detects that the first RLC PDU which is associated with the first RLC SDU and processed by the first RLC-layer entity is completely delivered may include that the first device detects that the multiple RLC PDUs associated with the first RLC SDU and processed by the first RLC-layer entity are completely delivered.

Here, the case that the first RLC PDU which is associated with the first RLC SDU and processed by the first RLC-layer entity is completely delivered may include that a data packet corresponding to the first RLC PDU has been delivered to the second device when the first RLC-layer entity is in an Acknowledged Mode (AM), or the first RLC-layer entity has sent the first RLC PDU when the first RLC-layer entity is in an Unacknowledged Mode (UM).

In a possible example, the operation that processing the second RLC SDU is interrupted includes that:
processing the incompletely processed second RLC SDU in a second RLC-layer entity is interrupted, or
processing the incompletely processed second RLC SDU in the first RLC-layer entity is interrupted.

Here, when the data duplication and transmission function of the PDCP-layer entity is in an active state, the first RLC SDU of the first RLC-layer entity is completely processed while the second RLC SDU in the second RLC-layer entity is incompletely processed, which may indicate that a carrier channel condition of the first RLC-layer entity is superior to a carrier channel condition of the second RLC-layer entity.

Here, the incompletely processed second RLC SDU means that the second RLC SDU is incompletely delivered. The incomplete delivery may include at least one of the following conditions: the second RLC SDU is not encapsulated or processed to become the second RLC PDU; the second RLC PDU associated with the second RLC SDU is not delivered to the MAC-layer entity; the second RLC PDU associated with the second RLC SDU, after being delivered to the MAC-layer entity, is not completely encapsulated and processed to become a MAC PDU; the MAC PDU associated with the second RLC SDU is not delivered to a Physical (PHY)-layer entity; the MAC PDU associated with the second RLC SDU, after being delivered to the PHY-layer entity, is not encapsulated or processed to become a PHY PDU; and the PHY PDU associated with the second RLC SDU is not delivered to the second device.

Thus it can be seen that, in the example, the first device interrupts the incompletely processed second RLC SDU, and detects whether the second RLC SDU is completely processed or not in a process of interrupting the second RLC SDU rather than blindly interrupts the second RLC SDU when the first RLC SDU is completely delivered. Therefore, data transmission accuracy and reliability of the first device can be improved.

From the above, in the embodiment of the disclosure, the first device, responsive to detecting that the first RLC PDU which is associated with the first RLC SDU and processed by the first RLC-layer entity is completely delivered, interrupts processing the second RLC SDU, the data duplication and transmission function of the PDCP-layer entity being in an active state, the first RLC PDU being an RLC PDU in at least one RLC PDU corresponding to the first RLC SDU and the first RLC SDU being the same as the second RLC SDU. Thus it can be seen that, when a carrier channel condition corresponding to the first RLC-layer entity is superior to a carrier channel condition corresponding to the second RLC-layer entity, there may exist such a condition that the first RLC PDU processed by the first RLC-layer entity and associated with the first RLC SDU is completely processed but the second RLC SDU which is processed by the second RLC-layer entity and is the same as the first RLC SDU is incompletely processed, and under this condition, processing the second RLC SDU is interrupted. Therefore, data buffer overflow of the second RLC-layer entity may be avoided, and security of data transmission can be improved.

In a possible example, the first RLC-layer entity is in an AM, and the operation that it is detected that the first RLC PDU which is associated with the first RLC SDU and processed by the first RLC-layer entity is completely delivered includes that:

it is detected that the first RLC-layer entity receives an ACK from the second device, the ACK being used to indicate that the first RLC PDU is completely delivered.

Here, when the first RLC-layer entity is in an AM, the first RLC-layer entity, when encapsulating and processing the first RLC SDU to obtain the first RLC PDU, adds a specific protocol overhead to a data format, and the second device, when receiving data corresponding to the first RLC PDU, may return the ACK.

Here, the ACK is adopted to indicate that the first RLC PDU is completely delivered. That is, the ACK is adopted to indicate that the first RLC PDU has been delivered to the second device.

Thus it can be seen that, in the example, the first device determines by receiving the ACK from the second device rather than making a judgment by its own that the first RLC PDU is completely delivered. Therefore, improvement of judgment accuracy of the first device and improvement of data processing reliability can be realized.

In a possible example, the first RLC-layer entity is in a UM, and the operation that it is detected that the first RLC PDU which is associated with the first RLC SDU and processed by the first RLC-layer entity is completely delivered includes that:

it is detected that the first RLC PDU associated with the first RLC SDU in the first RLC-layer entity has been sent.

Here, when the first RLC-layer entity is in an UM, since the second device may not return any information to the first device and the first device may not obtain any message through the second device, it can be acknowledged that the first RLC PDU is completely delivered when the first RLC PDU associated with the first RLC SDU in the first RLC-layer entity has been sent to the MAC-layer entity.

Thus it can be seen that, in the example, when the first RLC-layer entity is in an UM and cannot obtain through the second device a message indicating whether the first RLC PDU is completely delivered or not, whether the first RLC-layer entity in the device has sent the first RLC PDU to the MAC-layer entity or not is judged to further determine whether the first RLC PDU is completely delivered or not, and interaction between the device and a second device is not required for making the determination. Therefore, improvement of a data processing speed and convenience can be achieved.

In a possible example, the operation that processing the second RLC SDU is interrupted includes that:

the PDCP-layer entity is called to send a first indication message to the second RLC-layer entity, and the second RLC-layer entity is called to, responsive to the first indication message, interrupt encapsulating and/or mapping the incompletely processed second RLC SDU and discard the second RLC SDU, the second RLC SDU being not encapsulated and/or not mapped into the second RLC PDU;

or, the second RLC-layer entity is called to discard the second RLC SDU;

or, the PDCP-layer entity is called to send the first indication message to the first RLC-layer entity, and the first RLC-layer entity is called to, responsive to the first indication message, discard the second RLC SDU;

or, the first RLC-layer entity is called to discard the second RLC SDU.

Here, the first indication message is configured for the PDCP-layer entity to indicate the second RLC-layer entity to interrupt processing the second RLC SDU.

In the possible example, before the PDCP-layer entity is called to send the first indication message to the second RLC-layer entity, the method further includes that:

the first RLC-layer entity is called to send a second indication message to the PDCP-layer entity; and the PDCP-layer entity is called to, responsive to the second indication message, discard a PDCP PDU and PDCP SDU which are corresponding to the incompletely processed second RLC SDU.

Here, the second indication message is configured for the first RLC-layer entity to indicate the PDCP-layer entity to discard a data packet corresponding to the incompletely processed second RLC SDU.

Here, when the first device is a terminal, the first indication message and the second indication message are inter-layer signaling in the terminal; or, when the first device is a network-side device, the first indication message and the second indication message are information transmitted between each entity on a network side.

Here, information transmission between each entity of the network side may be implemented through an X2 interface or an Xn interface.

Thus it can be seen that, in the example, the first device calls the first RLC-layer entity to send the second indication message to the PDCP-layer entity and calls the PDCP-layer entity to send the first indication message to the second RLC-layer entity to timely process all data packets corresponding to the incompletely processed second RLC SDU and existing in the PDCP-layer entity and the second RLC-layer entity. Therefore, the data buffer overflow of the second RLC-layer entity can be avoided and the security of data transmission can be improved.

In a possible example, the first device is a terminal, the second device is a network-side device, the first RLC-layer entity is in an AM, and the operation that the first RLC PDU which is associated with the first RLC SDU and processed by the first RLC-layer entity is detected to be completely delivered includes that:

the first RLC-layer entity is called to receive a Common Status PDU from the second device; and it is detected according to the Common Status PDU that the first RLC PDU which is associated with the first RLC SDU and processed by the first RLC-layer entity is completely delivered.

Here, since multiple first RLC PDUs are delivered to the second device, the first RLC-layer entity may learn which first RLC PDUs are successfully delivered and which first RLC PDUs are failed to be delivered according to the Common Status PDU.

Here, the first RLC-layer entity may also learn about corresponding relationships between multiple first RLC PDUs and PDCP PDUs in the PDCP-layer entity or corresponding relationships between multiple first RLC PDUs and second RLC PDUs in the second RLC-layer entity through the Common Status PDU. Here, the corresponding relationships may also be obtained through a Sequence Number (SN). For example, it is indicated in the Common Status PDU that RLC PDU SN=3 is mapped to PDCP PDU SN=1.

In the possible example, the operation that processing the second RLC SDU is interrupted includes that:

the first RLC-layer entity is called to discard the first RLC SDU;

the first RLC-layer entity is called to send a third indication message to the second RLC-layer entity, the third indication message including the Common Status PDU;

the second RLC-layer entity is called to, responsive to the third indication message, interrupt transmitting the second RLC PDU associated with the incompletely processed second RLC SDU, the second RLC PDU being an RLC PDU in at least one RLC PDU corresponding to the second RLC SDU; and the second RLC PDU is discarded.

Here, the third indication message is inter-layer signaling in the terminal.

Here, when the second RLC-layer entity encapsulates and processes the second RLC SDU to obtain the RLC PDU, the second RLC-layer entity may cut and encapsulate the second RLC SDU to obtain multiple RLC PDUs, and the second RLC PDU is an RLC PDU in the multiple RLC PDUs.

Here, the second RLC-layer entity is called to respond to the third indication message, and the second RLC-layer entity may determine the second RLC SDU corresponding to the first RLC SDU according to the Common Status PDU in the third indication message and accurately execute a discard operation.

Here, after the second RLC PDU is discarded, the first device calls the second RLC-layer entity to notify the MAC-layer entity to stop a Hybrid Automatic Repeat request (HARQ) process corresponding to the second RLC SDU.

Thus it can be seen that, in the example, the first device receives the Common Status PDU from the second device to acquire the completely delivered first RLC SDU and the second RLC SDU corresponding to the first RLC SDU. Therefore, improvement of the accuracy of positioning and discarding a data packet and further improvement of the data transmission reliability can be achieved.

In a possible example, the second RLC SDU includes a retransmitted PDCP PDU. This case is applied to discard of an incompletely processed retransmitted PDCP PDU in the first RLC-layer entity or applied to an incompletely processed PDCP PDU in the second RLC-layer entity.

In a possible example, the second RLC SDU does not include a retransmitted PDCP PDU. This case is applied to discard of an incompletely processed PDCP PDU transmitted before a PDCP data recovery process in the second RLC-layer entity under the condition that a PDCP PDU transmitted for the first time in the first RLC-layer entity is completely delivered.

In a possible example, the second RLC SDU includes a retransmitted PDCP PDU and a PDCP PDU transmitted before a PDCP data recovery process. This case is applied to discard of an incompletely processed retransmitted PDCP PDU in the first RLC-layer entity and discard of the incompletely processed PDCP PDU transmitted before the PDCP data recovery process in the second RLC-layer entity, or applied to discard of an incompletely processed retransmitted PDCP PDU in the first RLC-layer entity and discard of an incompletely processed PDCP PDU transmitted before the PDCP data recovery process and a retransmitted PDCP PDU in the second RLC-layer entity, or applied to discard of an incompletely processed PDCP PDU transmitted before the PDCP data recovery process and a retransmitted PDCP PDU in the second RLC-layer entity.

Here, the retransmitted PDCP PDU is a PDCP PDU retransmitted in the PDCP data recovery process, and the PDCP PDU is a retransmitted PDCP PDU and is an SDU of an RLC layer.

The embodiments of the disclosure will be described below in combination with application scenarios.

Figure 3A:
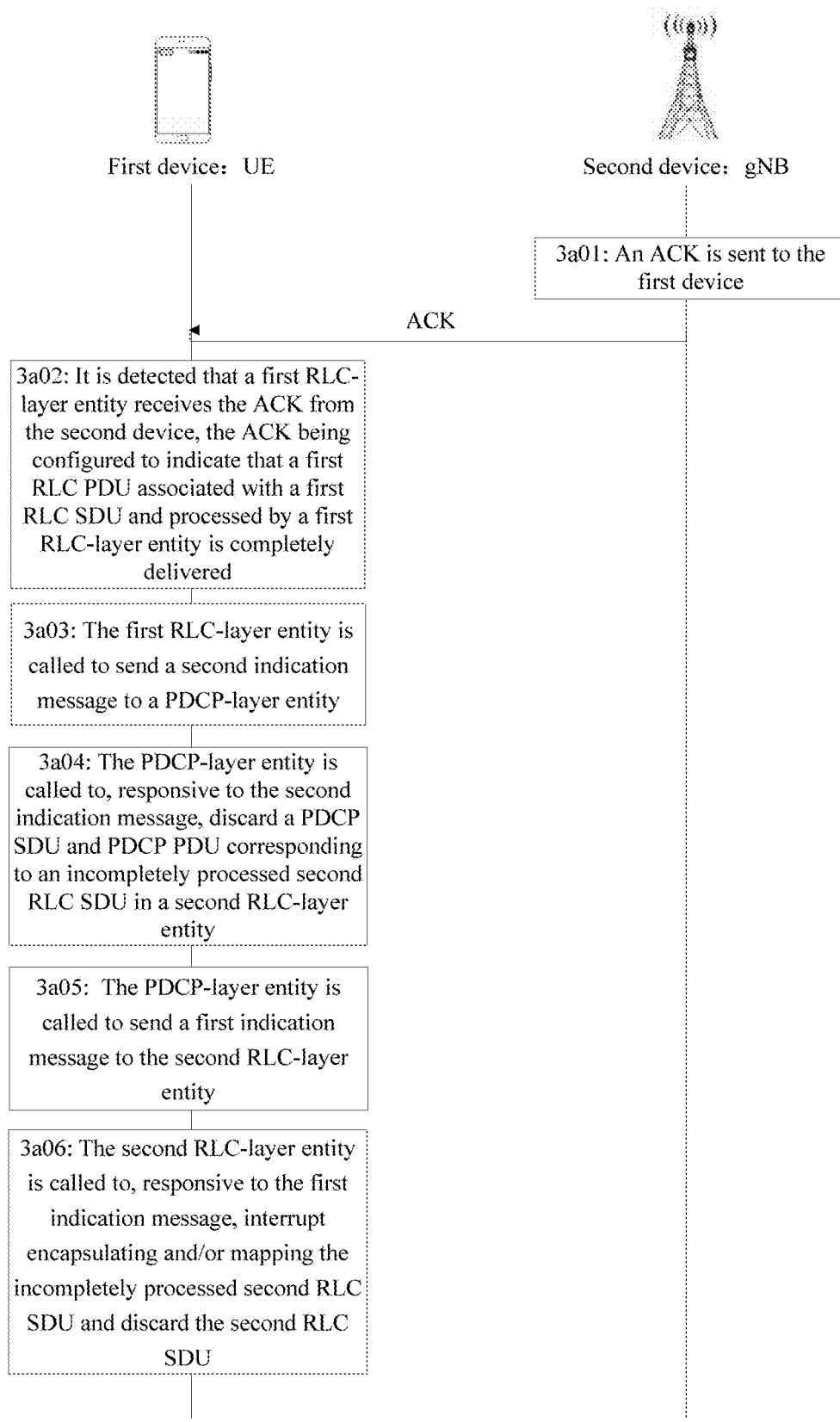
FIG. 3A is a schematic diagram of a data processing method in a 5G NR system scenario according to an embodiment of the disclosure.

Referring to FIG. 3A, FIG. 3A is another data processing method according to an embodiment of the disclosure. Here, a communication system is a 5G/NR communication system, a first device is UE in the 5G/NR system, a second device is a gNB in the 5G/NR system, a data duplication process of a PDCP-layer entity is in an active state, a first RLC-layer entity and a second RLC-layer entity are in an enabled state, and the first RLC-layer entity is in an AM. The method includes the following operations.

In 3a01, the second device sends an ACK to the first device.

In 3a02, the first device detects that the first RLC-layer entity receives the ACK from the second device, the ACK being configured to indicate that a first RLC PDU associated with a first RLC SDU and processed by the first RLC-layer entity is completely delivered.

Here, the first RLC PDU is an RLC PDU in at least one RLC PDU corresponding to the first RLC SDU.

In 3a03, the first device calls the first RLC-layer entity to send a second indication message to the PDCP-layer entity.

In 3a04, the first device calls the PDCP-layer entity to, responsive to the second indication message, discard a PDCP PDU and PDCP SDU which are corresponding to an incompletely processed second RLC SDU in the second RLC-layer entity.

Here, the first RLC SDU is the same as the second RLC SDU.

In 3a05, the first device calls the PDCP-layer entity to send a first indication message to the second RLC-layer entity.

In 3a06, the first device calls the second RLC-layer entity to, responsive to the first indication message, interrupt encapsulating and/or mapping the incompletely processed second RLC SDU and discard the second RLC SDU.

Here, the second RLC SDU is not encapsulated and/or not mapped into a second RLC PDU.

From the above, it can be seen that in the embodiment of the disclosure, the first device, responsive to detecting that the first RLC PDU which is associated with the first RLC SDU and processed by the first RLC-layer entity is completely delivered, interrupts processing the second RLC SDU, the data duplication and transmission function of the PDCP-layer entity being in an active state, the first RLC PDU being an RLC PDU in at least one RLC PDU corresponding to the first RLC SDU and the first RLC SDU being the same as the second RLC SDU. Thus it can be seen that, when a carrier channel condition corresponding to the first RLC-layer entity is superior to a carrier channel condition corresponding to the second RLC-layer entity, there may exist such a condition that the first RLC PDU processed by the first RLC-layer entity and associated with the first RLC SDU is completely processed but the second RLC SDU processed by the second RLC-layer entity and the same as the first RLC SDU is incompletely processed, and under this condition, processing the second RLC SDU is interrupted. Therefore, data buffer overflow of the second RLC-layer entity may be avoided, and improvement of security of data transmission can be achieved.

In addition, the first device determines by receiving the ACK from the second device rather than making a judgment by its own that the first RLC PDU is completely delivered.

Therefore, the judgment accuracy of the first device and the data processing reliability can be improved.

Figure 3B:
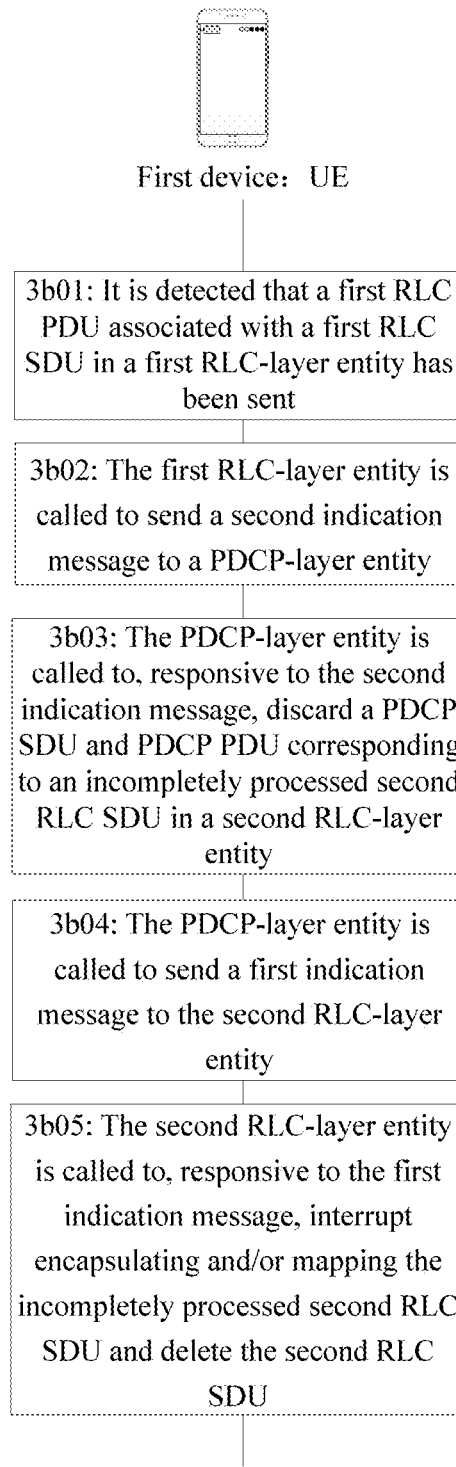
FIG. 3B is a schematic diagram of a data processing method in a 5G NR system scenario according to an embodiment of the disclosure.

Referring to FIG. 3B, FIG. 3B is another data processing method according to an embodiment of the disclosure. Here, a communication system is a 5G/NR communication system, a first device is UE in the 5G/NR system, a second device is a gNB in the 5G/NR system, a data duplication process of a PDCP-layer entity is in an active state, a first RLC-layer entity and a second RLC-layer entity are in an enabled state, and the first RLC-layer entity is in a UM. The method includes the following operations.

In 3$b$01, the first device detects that a first RLC PDU associated with a first RLC SDU in the first RLC-layer entity has been sent.

Here, the first RLC PDU is an RLC PDU in at least one RLC PDU corresponding to the first RLC SDU.

In 3$b$02, the first device calls the first RLC-layer entity to send a second indication message to the PDCP-layer entity.

In 3$b$03, the first device calls the PDCP-layer entity to, responsive to the second indication message, discard a PDCP PDU and PDCP SDU which are corresponding to an incompletely processed second RLC SDU in the second RLC-layer entity.

Here, the first RLC SDU is the same as the second RLC SDU.

In 3$b$04, the first device calls the PDCP-layer entity to send a first indication message to the second RLC-layer entity.

In 3$b$05, the first device calls the second RLC-layer entity to, responsive to the first indication message, interrupt encapsulating and/or mapping the incompletely processed second RLC SDU and discard the second RLC SDU.

Here, the second RLC SDU is not encapsulated and/or not mapped into a second RLC PDU.

From the above, it can be seen that in the embodiment of the disclosure, the first device, responsive to detecting that the first RLC PDU which is associated with the first RLC SDU and processed by the first RLC-layer entity is completely delivered, interrupts processing the second RLC SDU, the data duplication and transmission function of the PDCP-layer entity being in an active state, the first RLC PDU being an RLC PDU in at least one RLC PDU corresponding to the first RLC SDU and the first RLC SDU being the same as the second RLC SDU. Thus it can be seen that, when a carrier channel condition corresponding to the first RLC-layer entity is superior to a carrier channel condition corresponding to the second RLC-layer entity, there may exist such a condition that the first RLC PDU processed by the first RLC-layer entity and associated with the first RLC SDU is completely processed but the second RLC SDU processed by the second RLC-layer entity and the same as the first RLC SDU is incompletely processed, and under this condition, processing the second RLC SDU is interrupted. Therefore, data buffer overflow of the second RLC-layer entity may be avoided, and security of data transmission can be improved.

In addition, when the first RLC-layer entity is in an UM and cannot obtain a message indicating whether the first RLC PDU is completely delivered or not through the second device, whether the first RLC-layer entity in the device has sent the first RLC PDU to the MAC-layer entity or not is judged to further determine whether the first RLC PDU is completely delivered or not, and there is no need for the first device to interact with the second device when making such a determination. Therefore, improvement of a data processing speed and convenience can be achieved.

Figure 3C:
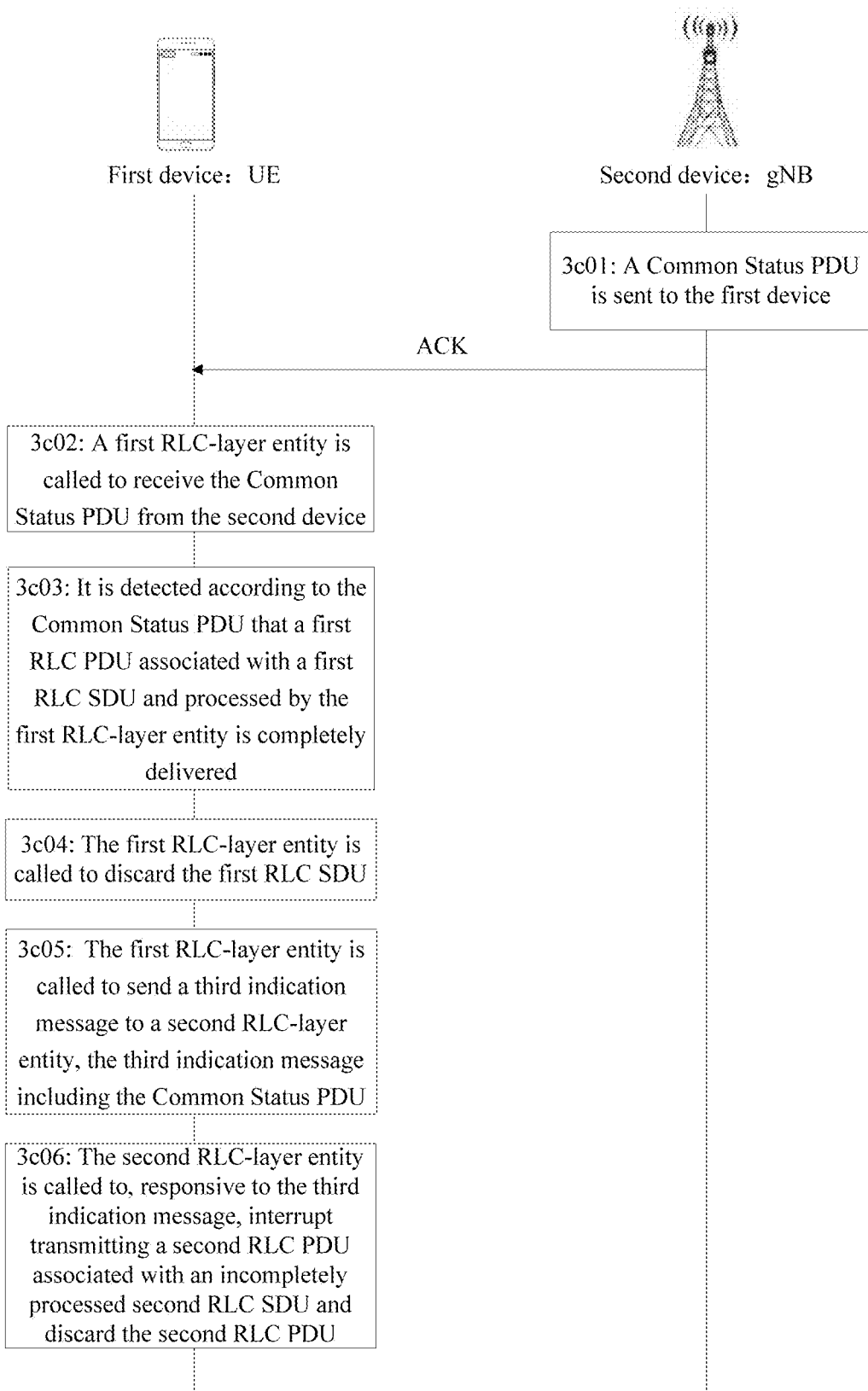
FIG. 3C is a schematic diagram of a data processing method in a 5G NR system scenario according to an embodiment of the disclosure.

Referring to FIG. 3C, FIG. 3C is another data processing method according to an embodiment of the disclosure. Here, a communication system is a 5G/NR communication system, a first device is UE in the 5G/NR system, a second device is a gNB in the 5G/NR system, the data duplication and transmission function of a PDCP-layer entity is in an active state, a first RLC-layer entity and a second RLC-layer entity are in an enabled state, and the first RLC-layer entity is in an AM. The method includes the following operations.

In 3$c$01, the second device sends a Common Status PDU to the first device.

In 3$c$02, the first device calls the first RLC-layer entity to receive the Common Status PDU from the second device.

In 3$c$03, the first device detects according to the Common Status PDU that a first RLC PDU associated with a first RLC SDU and processed by the first RLC-layer entity is completely delivered.

Here, the first RLC PDU is an RLC PDU in at least one RLC PDU corresponding to the first RLC SDU.

In 3$c$04, the first device calls the first RLC-layer entity to discard the first RLC SDU.

In 3$c$05, the first device calls the first RLC-layer entity to send a third indication message to the second RLC-layer entity, the third indication message including the Common Status PDU.

In 3$c$06, the first device calls the second RLC-layer entity to, responsive to the third indication message, interrupt transmitting a second RLC PDU associated with an incompletely processed second RLC SDU and discard the second RLC SDU.

Here, the first RLC SDU is the same as the second RLC SDU, and the second RLC PDU is an RLC PDU in at least one RLC PDU corresponding to the second RLC SDU.

From the above, it can be seen that in the embodiment of the disclosure, the first device, responsive to detecting that the first RLC PDU which is associated with the first RLC SDU and processed by the first RLC-layer entity is completely delivered, interrupts processing the second RLC SDU, the data duplication and transmission function of the PDCP-layer entity being in an active state, the first RLC PDU being an RLC PDU in at least one RLC PDU corresponding to the first RLC SDU and the first RLC SDU being the same as the second RLC SDU. Thus it can be seen that, when a carrier channel condition corresponding to the first RLC-layer entity is superior to a carrier channel condition corresponding to the second RLC-layer entity, there may exist such a condition that the first RLC PDU processed by the first RLC-layer entity and associated with the first RLC SDU is completely processed but the second RLC SDU processed by the second RLC-layer entity and the same as the first RLC SDU is incompletely processed, and under this condition, processing the second RLC SDU is interrupted. Therefore, data buffer overflow of the second RLC-layer entity may be avoided, and security of data transmission can be improved.

In addition, the first device receives the Common Status PDU from the second device to acquire the completely delivered first RLC SDU and the second RLC SDU corresponding to the first RLC SDU. Therefore, improved accuracy of positioning and discarding a data packet and further improved data transmission reliability can be achieved.

Figure 4:
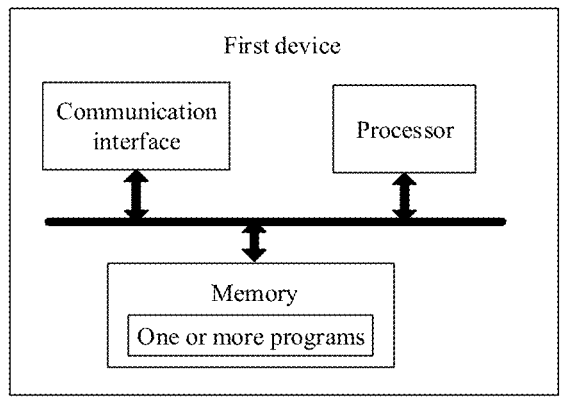
FIG. 4 is a schematic structure diagram of a first device according to an embodiment of the disclosure.

Consistent with the embodiment shown in FIG. 2A, referring to FIG. 4, FIG. 4 is a structure diagram of a first device according to an embodiment of the disclosure. As shown in the figure, the first device includes a processor, a memory, a communication interface and one or more programs. The one or more programs are stored in the memory and are configured to be executed by the processor. The programs include instructions configured to execute the following step.

Responsive to detecting that a first RLC PDU associated with a first RLC SDU and processed by a first RLC-layer entity is completely delivered, processing a second RLC SDU is interrupted, wherein a data duplication and transmission function of a PDCP-layer entity is in an active state, the first RLC PDU is an RLC PDU in at least one RLC PDU corresponding to the first RLC SDU and the first RLC SDU is the same as the second RLC SDU.

From the above, it can be seen that in the embodiment of the disclosure, the first device, responsive to detecting that the first RLC PDU which is associated with the first RLC SDU and processed by the first RLC-layer entity is completely delivered, interrupts processing the second RLC SDU, the data duplication and transmission function of the PDCP-layer entity being in an active state, the first RLC PDU being an RLC PDU in at least one RLC PDU corresponding to the first RLC SDU and the first RLC SDU being the same as the second RLC SDU. Thus it can be seen that, when a carrier channel condition corresponding to the first RLC-layer entity is superior to a carrier channel condition corresponding to the second RLC-layer entity, there may exist such a condition that the first RLC PDU processed by the first RLC-layer entity and associated with the first RLC SDU is completely processed but the second RLC SDU processed by the second RLC-layer entity and the same as the first RLC SDU is incompletely processed, and under this condition, processing the second RLC SDU is interrupted. Therefore, data buffer overflow of the second RLC-layer entity may be avoided, and improved security of data transmission can be achieved.

In a possible example, in terms of interrupting processing the second RLC SDU, the instructions in the programs are specifically configured to execute the following steps of: interrupting processing the incompletely processed second RLC SDU in the second RLC-layer entity, or interrupting processing the incompletely processed second RLC SDU in the first RLC-layer entity.

In a possible example, the first RLC-layer entity is in an AM, and in terms of detecting that the first RLC PDU which is associated with the first RLC SDU and processed by the first RLC-layer entity is completely delivered, the instructions in the programs are specifically configured to execute the following steps: detecting that the first RLC-layer entity receives an ACK from a second device, the ACK being configured to indicate that the first RLC PDU is completely delivered.

In a possible example, the first RLC-layer entity is in a UM, and in terms of detecting that the first RLC PDU which is associated with the first RLC SDU and processed by the first RLC-layer entity is completely delivered, the instructions in the programs are specifically configured to execute the following step: detecting that the first RLC PDU associated with the first RLC SDU in the first RLC-layer entity has been sent.

In a possible example, in terms of interrupting processing the second RLC SDU, the instructions in the programs are specifically configured to execute the following steps: calling the PDCP-layer entity to send a first indication message to the second RLC-layer entity, and calling the second RLC-layer entity to, responsive to the first indication message, interrupt encapsulating and/or mapping the incompletely processed second RLC SDU and discard the second RLC SDU, the second RLC SDU being not encapsulated and/or not mapped into a second RLC PDU; or, calling the second RLC-layer entity to discard the second RLC SDU; or, calling the PDCP-layer entity to send the first indication message to the first RLC-layer entity, and calling the first RLC-layer entity, responsive to the first indication message, discard the second RLC SDU; or, calling the first RLC-layer entity to discard the second RLC SDU.

In the example, the programs further include instructions configured to execute the following steps: calling the first RLC-layer entity to send a second indication message to the PDCP-layer entity before calling the PDCP-layer entity to send the first indication message to the second RLC-layer entity, and calling the PDCP-layer entity to, responsive to the second indication message, discard a PDCP PDU and PDCP SDU which are corresponding to the incompletely processed second RLC SDU.

In a possible example, the first device is a terminal, the second device is a network-side device, the first RLC-layer entity is in an AM, and in terms of detecting that the first RLC PDU which is associated with the first RLC SDU and processed by the first RLC-layer entity is completely delivered, the instructions in the programs are specifically configured to execute the following steps: calling the first RLC-layer entity to receive a Common Status PDU from the second device, and detecting according to the Common Status PDU that the first RLC PDU which is associated with the first RLC SDU and processed by the first RLC-layer entity is completely delivered.

In the possible example, in terms of interrupting processing the second RLC SDU, the instructions in the programs are specifically configured to execute the following steps: calling the first RLC-layer entity to discard the first RLC SDU; calling first RLC-layer entity to send a third indication message to the second RLC-layer entity, the third indication message including the Common Status PDU; calling the second RLC-layer entity to, responsive to the third indication message, interrupt transmitting the second RLC PDU associated with the incompletely processed second RLC SDU, the second RLC PDU being an RLC PDU in at least one RLC PDU corresponding to the second RLC SDU; and discarding the second RLC PDU.

In a possible example, when the first device is a terminal, the first indication message, the second indication message and the third indication message are inter-layer signaling in the terminal; or, when the first device is a network-side device, the first indication message and the second indication message are information transmitted between each entity on a network side.

Figure 5:
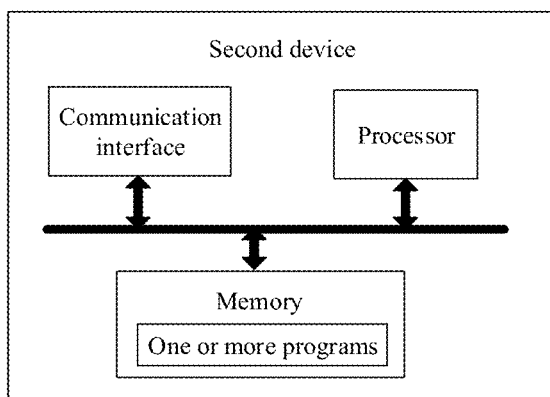
FIG. 5 is a schematic structure diagram of a second device according to an embodiment of the disclosure.

Matched with the embodiment shown in FIG. 3A, referring to FIG. 5, FIG. 5 is a structure diagram of a second device according to an embodiment of the disclosure. As shown in this figure, the second device includes a processor, a memory, a communication interface and one or more programs. The one or more programs are stored in the memory and are configured to be executed by the processor. The programs include instructions configured to execute the following steps:

an ACK is sent to a first device, the ACK being configured for the first device to, responsive to detecting that a first RLC PDU associated with a first RLC SDU and processed by a first RLC-layer entity is completely delivered, interrupt processing a second RLC SDU, the first RLC SDU being the same as the second RLC SDU, the first RLC PDU being an RLC PDU in at least one RLC PDU corresponding to the first RLC SDU and a data duplication and transmission function of a PDCP-layer entity of the first device being in an active state.

From the above, it can be seen that in the embodiment of the disclosure, the ACK is sent to the first device, the ACK being configured for the first device to, responsive to detecting that the first RLC PDU which is associated with the first RLC SDU and processed by the first RLC-layer entity is completely delivered, interrupt processing the second RLC SDU, the first RLC SDU being the same as the second RLC SDU, the first RLC PDU being an RLC PDU in the at least one RLC PDU corresponding to the first RLC SDU and the data duplication and transmission function of the PDCP-layer entity of the first device being in the active state. Thus it can be seen that, when a carrier channel condition corresponding to the first RLC-layer entity is superior to a carrier channel condition corresponding to the second RLC-layer entity, there may exist such a condition that the first RLC PDU processed by the first RLC-layer entity and associated with the first RLC SDU is completely processed but the second RLC SDU processed by the second RLC-layer entity and the same as the first RLC SDU is incompletely processed, and under this condition, processing the second RLC SDU is interrupted. Therefore, data buffer overflow of the second RLC-layer entity may be avoided, and improved security of data transmission can be achieved.

The solutions of the embodiments of the disclosure are introduced mainly from the aspect of interaction between each network element. It can be understood that, for achieving the functions, the first device and the second device include corresponding hardware structures and/or software modules executing each function. Those skilled in the art may easily realize that the units and algorithm steps of each example described in combination with the embodiments disclosed in the disclosure may be implemented by hardware or a combination of hardware and computer software in the disclosure. Whether a certain function is executed by hardware or in a manner of driving the hardware by computer software depends on specific applications and design constraints of the technical solutions. Professionals may realize the described functions for each specific application by different methods, but such realization shall fall within the scope of the disclosure.

According to the embodiments of the disclosure, functional units of the first device and the second device may be divided according to the abovementioned method examples. For example, each functional unit may be divided correspondingly based on each function and two or more than two functions may also be integrated into a processing unit. The integrated unit may be implemented as hardware or a software program module. It is to be noted that division of the units in the embodiment of the disclosure is schematic and only logical functional division and other division manners may be adopted in practical implementation.

Figure 6:
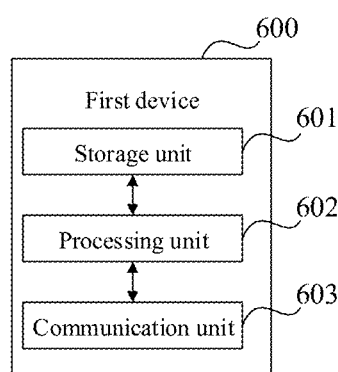
FIG. 6 is a composition block diagram of functional units of a first device according to an embodiment of the disclosure.

Under the condition that an integrated unit is adopted, FIG. 6 is a possible composition block diagram of functional units of a first device involved in the abovementioned embodiments. The first device 600 includes a processing unit 602 and a communication unit 603. The processing unit 602 is configured to control and manage an operation of the first device. For example, the processing unit 602 is configured to support the first device to execute the operation 201 in FIG. 2A, the operations 3a02-3a06 in FIG. 3A, the operations 3b01-3b05 in FIG. 3B and the operations 3c02-3c06 in FIG. 3C, and/or is configured for other processes of a technology described in the disclosure. The communication unit 603 is configured to support communication between the first device and other devices, for example, communication with the second device shown in FIG. 5. The first device may further include a storage unit 601, configured to store a program code and data of the first device.

Here, the processing unit 602 may be a processor or a controller, which for example, may be a Central Processing Unit (CPU), a universal processor, a Digital Signal Processor (DSP), an Application-Specific Integrated Circuit (ASIC), a Field Programmable Gate Array (FPGA) or other programmable logical device, transistor logical device, hardware component or any combination thereof. The processing unit 602 may implement or execute various exemplary logical blocks, modules and circuits described in combination with the contents disclosed in the disclosure. The processor may also be a combination realizing a calculation function, for example, a combination of one or more microprocessors and a combination of a DSP and a microprocessor. The communication unit 603 may be a communication interface, a transceiver circuit and the like. The storage unit 601 may be a memory.

Here, the processing unit 602 is configured to, responsive to detecting that a first RLC PDU associated with a first RLC SDU and processed by a first RLC-layer entity is completely delivered, interrupt processing a second RLC SDU, wherein a data duplication and transmission function of a PDCP-layer entity is in an active state, the first RLC PDU is an RLC PDU in at least one RLC PDU corresponding to the first RLC SDU and the first RLC SDU is the same as the second RLC SDU.

Here, the data duplication and transmission function of the PDCP-layer entity may also be in an inactive state. There is no unique limit made herein.

Here, the second RLC SDU includes a retransmitted PDCP PDU. Or, the second RLC SDU does not include a retransmitted PDCP PDU. The retransmitted PDCP PDU is a PDCP PDU retransmitted in a PDCP data recovery process, and the PDCP PDU is a retransmitted PDCP PDU and is an SDU of an RLC layer.

In a possible example, in terms of interrupting processing the second RLC SDU, the processing unit 602 is specifically configured to interrupt processing the incompletely processed second RLC SDU in a second RLC-layer entity or interrupt processing the incompletely processed second RLC SDU in the first RLC-layer entity.

In a possible example, the first RLC-layer entity is in an AM, and in terms of detecting that the first RLC PDU which is associated with the first RLC SDU and processed by the first RLC-layer entity is completely delivered, the processing unit 602 is specifically configured to detect that the first RLC-layer entity receives an ACK from a second device through the communication unit 603, the ACK being configured to indicate that the first RLC PDU is completely delivered.

In a possible example, the first RLC-layer entity is in a UM, and in terms of detecting that the first RLC PDU which is associated with the first RLC SDU and processed by the first RLC-layer entity is completely delivered, the processing unit 602 is specifically configured to detect that the first RLC PDU associated with the first RLC SDU in the first RLC-layer entity has been sent.

In a possible example, in terms of interrupting processing the second RLC SDU, the processing unit 602 is specifically configured to:

call the PDCP-layer entity to send a first indication message to the second RLC-layer entity and call the second RLC-layer entity to, responsive to the first indication message, interrupt encapsulating and/or mapping the incompletely processed second RLC SDU and discard the second RLC SDU, the second RLC SDU being not encapsulated and/or not mapped into a second RLC PDU, or, call the second RLC-layer entity to discard the second RLC SDU, or, call the PDCP-layer entity to send the first indication message to the first RLC-layer entity and call the first RLC-layer entity to, responsive to the first indication message, discard the second RLC SDU, or, call the first RLC-layer entity to discard the second RLC SDU.

In the example, the processing unit 602, before calling the PDCP-layer entity to send the first indication message to the second RLC-layer entity, is further configured to, call the first RLC-layer entity to send a second indication message to the PDCP-layer entity, and is configured to call the PDCP-layer entity to, responsive to the second indication message, discard a PDCP PDU and PDCP SDU which are corresponding to the incompletely processed second RLC SDU.

In a possible example, the first device is a terminal, the second device is a network-side device, the first RLC-layer entity is in an AM, and in terms of detecting that the first RLC PDU which is associated with the first RLC SDU and processed by the first RLC-layer entity is completely delivered, the processing unit 602 is specifically configured to call the first RLC-layer entity to receive a Common Status PDU from the second device, and is configured to detect according to the Common Status PDU that the first RLC PDU which is associated with the first RLC SDU and processed by the first RLC-layer entity is completely delivered.

In the possible example, in terms of interrupting processing the second RLC SDU, the processing unit 602 is specifically configured to call the first RLC-layer entity to discard the first RLC SDU; call the first RLC-layer entity to send a third indication message to the second RLC-layer entity, the third indication message including the Common Status PDU; call the second RLC-layer entity to, responsive to the third indication message, interrupt transmitting the second RLC PDU associated with the incompletely processed second RLC SDU, the second RLC PDU being an RLC PDU in at least one RLC PDU corresponding to the second RLC SDU, and is configured to discard the second RLC PDU.

In a possible example, when the first device is a terminal, the first indication message, the second indication message and the third indication message are inter-layer signaling in the terminal; or, when the first device is a network-side device, the first indication message and the second indication message are information transmitted between each entity on a network side.

When the processing unit 602 is a processor, the communication unit 603 is a communication interface and the storage unit 601 is a memory, the first device involved in the embodiment of the disclosure may be the first device shown in FIG. 4.

Figure 7:
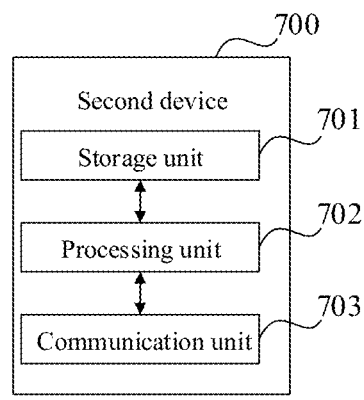
FIG. 7 is a composition block diagram of functional units of a second device according to an embodiment of the disclosure.

Under the condition that an integrated unit is adopted, FIG. 7 is a possible composition block diagram of functional units of a second device involved in the abovementioned embodiments. The second device 700 includes a processing unit 702 and a communication unit 703. The processing unit 702 is configured to control and manage an operation of the second device. For example, the processing unit 702 is configured to support the second device to execute the operation 3a01 in FIG. 3A and the operation 3c01 in FIG. 3C, and/or is configured for another process of a technology described in the disclosure. The communication unit 703 is configured to support communication between the second device and another device, for example, communication with the first device shown in FIG. 4. The second device may further include a storage unit 701, configured to store a program code and data of the second device.

Here, the processing unit 702 may be a processor or a controller, which for example, may be a CPU, a universal processor, a DSP, an ASIC, an FPGA or other programmable logical device, transistor logical device, hardware component or any combination thereof. The processing unit 702 may implement or execute various exemplary logical blocks, modules and circuits described in combination with the contents disclosed in the disclosure. The processor may also be a combination realizing a calculation function, for example, a combination of one or more microprocessors and a combination of a DSP and a microprocessor. The communication unit 703 may be a communication interface, a transceiver circuit, a Radio Frequency (RF) chip and the like. The storage unit 701 may be a memory.

Here, the processing unit 702 is configured to send an ACK to a first device through the communication unit 703, the ACK being configured for the first device to, responsive to detecting that a first RLC PDU associated with a first RLC SDU and processed by a first RLC-layer entity is completely delivered, interrupt processing a second RLC SDU, the first RLC SDU being the same as the second RLC SDU, the first RLC PDU being an RLC PDU in at least one RLC PDU corresponding to the first RLC SDU and a data duplication and transmission function of a PDCP-layer entity of the first device being in an active state.

When the processing unit 702 is a processor, the communication unit 703 is a communication interface and the storage unit 701 is a memory, the second device involved in the embodiment of the disclosure may be the second device shown in FIG. 5.

Figure 8:
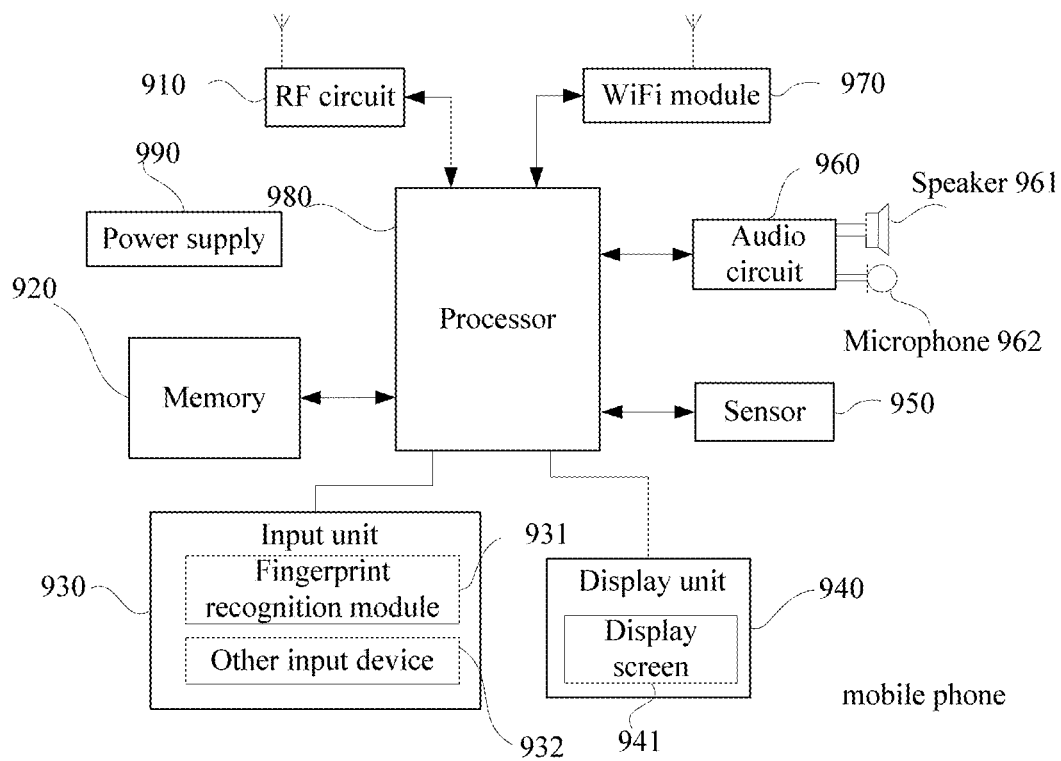
FIG. 8 is a schematic structure diagram of a terminal according to an embodiment of the disclosure.

An embodiment of the disclosure also provides a terminal. As shown in FIG. 8, only parts related to the embodiment of the application are shown for convenient description, and specific technical details which are undescribed refer to parts of the method of the embodiments of the disclosure. The terminal may be any terminal device including a mobile phone, a tablet computer, a Personal Digital Assistant (PDA), a Point of Sales (POS), a vehicle-mounted computer and the like. For example, the terminal is a mobile phone.

FIG. 8 is a block diagram of part of a structure of a mobile phone related to a terminal according to an embodiment of the disclosure. Referring to FIG. 8, the mobile phone includes components such as an RF circuit 910, a memory 920, an input unit 930, a display unit 940, a sensor 950, an audio circuit 960, a Wireless Fidelity (WiFi) module 970, a processor 980 and a power supply 990. Those skilled in the art should know that the structure of the mobile phone shown in FIG. 8 is not intended to limit the mobile phone but may include components more or fewer than those shown in the figure, or some components are combined or different component arrangements are adopted.

Each component of the mobile phone will be specifically introduced below in combination with FIG. 8.

The RF circuit 910 may be configured to receive and send information. The RF circuit 910 usually includes, but not limited to, an antenna, at least one amplifier, a transceiver, a coupler, a Low Noise Amplifier (LNA), a duplexer and the like. In addition, the RF circuit 910 may also communicate with a network and other device through wireless communication. Any communication standard or protocol may be adopted for wireless communication, including, but not limited to, GSM, GPRS, CDMA, WCDMA, LTE, electronic mail, Short Messaging Service (SMS) and the like.

The memory 920 may be configured to store a software program and a module. The processor 980 operates a software program and module stored in the memory 920, thereby executing various functional applications and data processing the mobile phone. The memory 920 may mainly include a program storage region and a data storage region. The program storage region may store an operating system, an application program required by at least one function and the like. The data storage region may store data created according to use of the mobile phone and the like. In addition, the memory 920 may include a high-speed Random Access Memory (RAM) and may further include a nonvolatile memory, for example, at least one disk storage device, flash memory device or other volatile solid-state storage devices.

The input unit 930 may be configured to receive input digital or character information and generate key signal input related to user setting and function control of the mobile phone. Specifically, the input unit 930 may include a fingerprint recognition module 931 and another input device 932. The fingerprint recognition module 931 may acquire fingerprint data of a user. Besides the fingerprint recognition module 931, the input unit 930 may further include another input device 932. Specifically, the another input device 932 may include, but not limited to, one or more of a touch screen, a physical keyboard, a function key (for example, a volume control button and a switch button), a trackball, a mouse, a stick and the like.

The display unit 940 may be configured to display information input by a user or information provided for the user and various menus of the mobile phone. The display unit 940 may include a display screen 941. Optionally, the display screen 941 may be configured in form of Liquid Crystal Display (LCD), Organic Light-Emitting Diode (OLED) or the like. In FIG. 8, the fingerprint recognition module 931 and the display screen 941 realize input and output functions of the mobile phone as two independent components. However, in some embodiments, the fingerprint recognition module 931 and the display screen 941 may be integrated to realize the input and play functions of the mobile phone.

The mobile phone may further include at least one sensor 950, for example, an optical sensor, a motion sensor and other sensors. Specifically, the optical sensor may include an environmental optical sensor and a proximity sensor. The environmental optical sensor may regulate brightness of the display screen 941 according to brightness of environmental light, and the proximity sensor may turn off the display screen 941 and/or backlight when the mobile phone is moved to an ear. As a motion sensor, an accelerometer sensor may detect a magnitude of an acceleration in each direction (usually three axes), may detect a magnitude and direction of the gravity under a motionless condition, and may be configured for an application recognizing a posture of the mobile phone (for example, landscape and portrait switching, a related game and magnetometer posture calibration), a vibration recognition related function and the like (for example, a pedometer and knocking). Other sensors will not be elaborated herein, for example, a gyroscope, a barometer, a hygrometer, a thermometer and an infrared sensor, which may be configured in the mobile phone.

The audio circuit 960 includes a speaker 961, and a microphone 962 may provide an audio interface between a user and the mobile phone. The audio circuit 960 may transmit an electric signal obtained by converting received audio data to the speaker 961, and the speaker 961 converts it into a sound signal for playing. On the other hand, the microphone 962 converts a collected sound signal into an electric signal, the audio circuit 960 receives and converts it into audio data, and the audio data is processed by the playing processor 980 and sent to, for example, another mobile phone through the RF circuit 910, or the audio data is played to the memory 920 for further processing.

WiFi is a short-distance wireless transmission technology. The mobile phone may help a user through the WiFi module 970 to receive and send an electronic mail, browse a webpage, access streaming media and the like, and wireless wideband Internet access is provided for the user. Although the WiFi module 970 is shown in FIG. 8, it can be understood that it is not a necessary composition of the mobile phone and may completely be omitted according to a requirement without changing the scope of the essence of the disclosure.

The processor 980 is a control center of the mobile phone, which connects each part of the whole mobile phone by various interfaces and lines and executes various functions and data processing the mobile phone by running or executing the software program and/or module stored in the memory 920 and calling data stored in the memory 920, thereby monitoring the whole mobile phone. Optionally, the processor 980 may include one or more processing units. Optionally, the processor 980 may integrate an application processor and a modulation and demodulation processor. The application processor mainly processes the operating system, a user interface, an application program and the like. The modulation and demodulation processor mainly processes wireless communication. It can be understood that the modulation and demodulation processor may also not be integrated into the processor 980.

The mobile phone further includes the power supply 990 (for example, a battery) supplying power to each part. Optionally, the power supply may be logically connected with the processor 980 through a power management system, thereby managing the charging and discharging and power consumption and similar functions through the power management system.

Although not shown in the figure, the mobile phone may further include a camera, a Bluetooth module and the like, which will not be elaborated herein.

In the embodiments shown in FIG. 2A and FIG. 3A-3C, the flow in each operations of the methods when the first device or the second device is a terminal may be implemented on the basis of the structure of the mobile phone.

In the embodiments shown in FIG. 4 and FIG. 5, each functional unit may be implemented on the basis of the structure of the mobile phone.

An embodiment of the disclosure also provides a computer-readable storage medium, which stores a computer program configured for electronic data exchange, the computer program enabling a computer to execute part or all of the steps executed by the first device in, for example, the abovementioned method embodiments.

An embodiment of the disclosure also provides a computer-readable storage medium, which stores a computer program configured for electronic data exchange, the computer program enabling a computer to execute part or all of the steps executed by the second device in, for example, the abovementioned method embodiments.

An embodiment of the disclosure further provides a computer program product. The computer program product includes a non-transitory computer-readable storage medium storing a computer program. The computer program may be operated to enable a computer to execute part or all of the steps executed by the first device in, for example, the abovementioned method embodiments. The computer program product may be a software installation package.

An embodiment of the disclosure further provides a computer program product. The computer program product includes a non-transitory computer-readable storage medium storing a computer program. The computer program may be operated to enable a computer to execute part or all of the steps executed by the second device in, for example, the abovementioned methods. The computer program product may be a software installation package.

The steps of the method or algorithm described in the embodiments of the disclosure may be implemented in a hardware manner, or may also be implemented in a manner of executing, by a processor, software. A software instruction may consist of software modules, and the software modules may be stored in a RAM, a flash memory, a Read Only Memory (ROM), an Erasable Programmable ROM (EPROM), an Electrically EPROM (EEPROM), a register, a hard disk, a mobile hard disk, a Compact Disc-ROM (CD-ROM) or a storage medium in any other form well known in the field. An exemplary storage medium is coupled to a processor, thereby enabling the processor to read information from the storage medium and write information into the storage medium. Of course, the storage medium may also be a component of the processor. The processor and the storage medium may be located in an ASIC. In addition, the ASIC may be located in an access network device, a target network device or a core network device. Of course, the processor and the storage medium may also exist in the access network device, the target network device or the core network device as discrete components.

Those skilled in the art may realize that, in one or more abovementioned examples, all or part of the functions described in the embodiments of the disclosure may be realized through software, hardware or any combination thereof. During implementation with the software, the embodiments may be implemented completely or partially in form of computer program product. The computer program product includes one or more computer instructions. When the computer program instruction is loaded and executed on a computer, the flows or functions according to the embodiments of the disclosure are completely or partially generated. The computer may be a universal computer, a dedicated computer, a computer network or other programmable devices. The computer instruction may be stored in a computer-readable storage medium or transmitted from a computer-readable storage medium to another computer-readable storage medium. For example, the computer instruction may be transmitted from a website, computer, server or data center to another website, computer, server or data center in a wired (for example, coaxial cable, optical fiber and Digital Subscriber Line (DSL)) or wireless (for example, infrared, wireless and microwave) manner. The computer-readable storage medium may be any available medium accessible for the computer or a data storage device, such as a server and a data center, including one or more integrated available media. The available medium may be a magnetic medium (for example, a floppy disk, a hard disk and a magnetic tape), an optical medium (for example, a Digital Video Disc (DVD)), a semiconductor medium (for example, a Solid State Disk (SSD)) or the like.

The abovementioned specific implementation modes further describe the purposes, technical solutions and beneficial effects of the embodiments of the disclosure in detail. It is to be understood that the above is only the implementation modes of the embodiments of the disclosure but not intended to limit the scope of protection of the embodiments of the disclosure. Any modifications, equivalent replacements, improvements and the like made on the basis of the technical solutions of the embodiments of the disclosure shall fall within the scope of protection of the embodiments of the disclosure.

The invention claimed is:

1. A method for data processing, applied to a first device, the first device comprising a Packet Data Convergence Protocol (PDCP)-layer entity and a first Radio Link Control (RLC)-layer entity, the method comprising:
   receiving, by the PDCP-layer entity, a PDCP Service Data Unit (SDU);
   encapsulating and processing, by the PDCP-layer entity, the PDCP SDU to obtain a PDCP Protocol Data Unit (PDU) and a duplicate PDCP PDU, in a case that a data duplication and transmission function of the PDCP-layer entity is in an active state;
   transmitting, by the PDCP-layer entity, the PDCP PDU and the duplicate PDCP PDU to the first RLC-layer entity and a second RLC-layer entity respectively;
   interrupting processing, by the second RLC-layer entity, of a second RLC SDU which is incompletely processed in the second RLC-layer entity, responsive to detecting by the first RLC-layer entity that a first RLC PDU which is associated with a first RLC Service Data Unit (SDU) and processed by the first RLC-layer entity is completely delivered, wherein, the first RLC PDU is an RLC PDU in at least one RLC PDU corresponding to the first RLC SDU, the first RLC SDU corresponds to the PDCP PDU, the second RLC SDU corresponds to the duplicate PDCP PDU, and the first RLC SDU is the same as the second RLC SDU;
   wherein interrupting processing the second RLC SDU comprises:
      calling the PDCP-layer entity to send a first indication message to the second RLC-layer entity;
      calling the second RLC-layer entity to, responsive to the first indication message, discard the second RLC SDU, wherein the second RLC SDU is not encapsulated, or mapped, or encapsulated and mapped into a second RLC PDU;
   wherein before calling the PDCP-layer entity to send the first indication message to the second RLC-layer entity, the method further comprising:
   calling the first RLC-layer entity to send a second indication message to the PDCP-layer entity; and
   calling the PDCP-layer entity to, responsive to the second indication message, discard the duplicate PDCP PDU and the PDCP SDU which are corresponding to the incompletely processed second RLC SDU.

2. The method of claim 1, wherein the first RLC-layer entity is in an Acknowledged Mode (AM), and detecting that the first RLC PDU which is associated with the first RLC SDU and processed by the first RLC-layer entity is completely delivered comprises:
   detecting that the first RLC-layer entity receives an Acknowledgement (ACK) from a second device, the ACK being configured to indicate that the first RLC PDU is completely delivered.

3. The method of claim 2, wherein interrupting processing the second RLC SDU comprises:
   calling the second RLC-layer entity to discard the second RLC SDU.

4. The method of claim 2, wherein when the first device is a terminal, the first indication message and the second indication message are inter-layer signaling in the terminal; or, when the first device is a network-side device, the first indication message and the second indication message are information transmitted between each entity on a network side.

5. The method of claim 1, wherein the first RLC-layer entity is in an Unacknowledged Mode (UM), and detecting that the first RLC PDU which is associated with the first RLC SDU and processed by the first RLC-layer entity is completely delivered comprises:

detecting that the first RLC PDU associated with the first RLC SDU in the first RLC-layer entity has been sent.

6. The method of claim 1, wherein the first device is a terminal, the first RLC-layer entity is in an AM, and detecting that the first RLC PDU which is associated with the first RLC SDU and processed by the first RLC-layer entity is completely delivered comprises:

calling the first RLC-layer entity to receive a Common Status PDU from a network-side device; and detecting according to the Common Status PDU that the first RLC PDU which is associated with the first RLC SDU and processed by the first RLC-layer entity is completely delivered.

7. The method of claim 1, wherein the second RLC SDU comprises a retransmitted PDCP PDU.

8. The method of claim 7, wherein the retransmitted PDCP PDU is PDCP PDU retransmitted before a PDCP data recovery process.

9. The method of claim 1, wherein the second RLC SDU comprises a retransmitted PDCP PDU and PDCP PDU transmitted before a PDCP data recovery process.

10. A non-transitory computer-readable storage medium, storing a computer program for electronic data exchange, wherein the computer program enables a computer to execute the method of claim 1.

11. A first device, comprising a processor, a memory, a communication interface and one or more programs, wherein the one or more programs are stored in the memory and are configured to be executed by the processor, and the one or more programs comprise instructions configured to execute a step of:

receiving a Packet Data Convergence Protocol (PDCP) Service Data Unit (SDU) at a PDCP-layer entity;

encapsulating and processing the PDCP SDU at the PDCP-layer entity to obtain a PDCP Protocol Data Unit (PDU) and a duplicate PDCP PDU;

transmitting the PDCP PDU and the duplicate PDCP PDU at the PDCP-layer entity to a first RLC-layer entity and a second RLC-layer entity respectively;

interrupting processing of a second RLC SDU which is incompletely processed in the second RLC-layer entity, responsive to detecting that a first RLC PDU which is associated with a first RLC Service Data Unit (SDU) and processed by the first RLC-layer entity is completely transmitted, wherein a data duplication and transmission function of the PDCP-layer entity is in an active state, the first RLC PDU is an RLC PDU in at least one RLC PDU corresponding to the first RLC SDU, the first RLC SDU corresponds to the PDCP PDU, the second RLC SDU corresponds to the duplicate PDCP PDU, and the first RLC SDU is the same as the second RLC SDU;

call the PDCP-layer entity to send a first indication message to the second RLC-layer entity and call the second RLC-layer entity to, responsive to the first indication message, interrupt performing at least one of encapsulation or mapping on the second RLC SDU which is incompletely processed and discard the second RLC SDU, wherein the second RLC SDU is not encapsulated, or mapped, or encapsulated and mapped into a second RLC PDU;

wherein before calling the PDCP-layer entity to send the first indication message to the second RLC-layer entity, calling the first RLC-layer entity to send a second indication message to the PDCP-layer entity, and calling the PDCP-layer entity to, responsive to the second indication message, discard the duplicate PDCP PDU and the PDCP SDU which are corresponding to the second RLC SDU which is incompletely processed.

12. The first device of claim 11, wherein the first RLC-layer entity is in an Acknowledged Mode (AM) the one or more programs comprise instructions configured to:

detect that the first RLC-layer entity receives an Acknowledgement (ACK) from a second device through the communication interface, the ACK being configured to indicate that the first RLC PDU is completely transmitted.

13. The first device of claim 11, wherein the one or more programs comprise instructions configured to call the second RLC-layer entity to discard the second RLC SDU.

* * * * *